United States Patent
Wilson et al.

(10) Patent No.: US 9,771,478 B2
(45) Date of Patent: Sep. 26, 2017

(54) DISPERSION OF MICROCAPSULES FOR SELF-HEALING APPLICATIONS

(71) Applicant: Automatic Materials, Inc., Champaign, IL (US)

(72) Inventors: Gerald O. Wilson, Champaign, IL (US); Subramanyam V. Kasisomayajula, Champaign, IL (US); Ryan T. Blanchette, Urbana, IL (US)

(73) Assignee: Autonomic Materials, Inc., Champaign, IL (US)

( * ) Notice: Subject to any disclaimer, the term of this patent is extended or adjusted under 35 U.S.C. 154(b) by 89 days.

(21) Appl. No.: 14/329,740

(22) Filed: Jul. 11, 2014

(65) Prior Publication Data

US 2015/0018485 A1    Jan. 15, 2015

Related U.S. Application Data

(60) Provisional application No. 61/845,499, filed on Jul. 12, 2013.

(51) Int. Cl.
    *C08L 59/04*     (2006.01)
    *C08L 71/02*     (2006.01)
    (Continued)

(52) U.S. Cl.
    CPC ............ *C08L 71/02* (2013.01); *C08L 61/24* (2013.01); *C09D 5/00* (2013.01); *C09D 161/24* (2013.01)

(58) Field of Classification Search
    CPC ......... C08L 61/24; C08L 75/04; A01N 25/04; A01N 25/28; C08F 2/22; C08F 2/18;
    (Continued)

(56) References Cited

U.S. PATENT DOCUMENTS 3,516,846 A     6/1970  Matson
3,928,272 A  * 12/1975  Brancato .................... C08J 3/09
                                                 162/166
(Continued)

FOREIGN PATENT DOCUMENTS

EP      0686425 A1    12/1995

OTHER PUBLICATIONS

PCT International Search for PCT/US2014/046407, mailed Oct. 16, 2014.

*Primary Examiner* — Jeffrey Washville
(74) *Attorney, Agent, or Firm* — Schwabe, Williamson & Wyatt, P.C.

(57) ABSTRACT

Disclosed herein are compositions and methods for increasing microcapsule dispersion in self-healing paint and coating applications, and more particularly for non-covalent functionalization of polymeric microcapsule shell walls for improved dispersion in polymeric material formulations. Some embodiments are methods of forming a microcapsule dispersion, the methods including providing a polymeric material capable of forming a plurality of microcapsules; initiating polymerization of the polymeric material under reaction conditions sufficient to permit formation of the plurality of microcapsules; and adding an ethoxy-functionalized dispersant to the polymeric material before formation of the plurality of microcapsules is complete, thereby forming the microcapsule dispersion.

29 Claims, 14 Drawing Sheets

(51) Int. Cl.
  *C09D 5/00*      (2006.01)
  *C09D 161/24*    (2006.01)
  *C08L 61/24*     (2006.01)

(58) Field of Classification Search
  CPC .. C08F 2/24; C08F 2/32; G03G 9/093; A61K 9/10; A61K 9/4808; A61K 9/4891; A61K 2800/412; A61K 8/11; A61K 9/5192
  See application file for complete search history.

(56) References Cited

U.S. PATENT DOCUMENTS

| | | |
|---|---|---|
| 4,001,140 A | 1/1977 | Foris et al. |
| 4,851,318 A * | 7/1989 | Hsieh ............... G03G 9/09392 428/402.24 |
| 5,164,126 A | 11/1992 | Kalishek et al. |
| 5,492,789 A | 2/1996 | Igarashi et al. |
| 5,650,102 A | 7/1997 | Hagedorn et al. |
| 6,340,653 B1 | 1/2002 | Scher et al. |
| 6,955,823 B2 | 10/2005 | Casson et al. |
| 7,226,607 B2 | 6/2007 | Uchiyama et al. |
| 8,434,860 B2 | 5/2013 | Hook et al. |
| 2006/0148652 A1 | 7/2006 | Van Denabeele et al. |
| 2008/0064785 A1 | 3/2008 | Martin et al. |
| 2012/0157315 A1* | 6/2012 | Casana Giner ........ A01N 25/28 504/359 |

* cited by examiner

DISPERSION OF MICROCAPSULES FOR SELF-HEALING APPLICATIONS

CROSS-REFERENCE TO RELATED APPLICATION

This application claims the benefit of the filing date of U.S. Provisional Patent Application No. 61/845,499, filed Jul. 12, 2013, entitled "DISPERSION OF MICROCAPSULES FOR SELF-HEALING APPLICATIONS," the disclosure of which is incorporated herein in its entirety.

TECHNICAL FIELD

Embodiments herein relate to compositions and methods for increasing microcapsule dispersion in self-healing paint and coating applications, and more particularly to non-covalent functionalization of polymeric microcapsule shell walls for improved dispersion in polymeric material formulations.

BACKGROUND

Microcapsules incorporated into liquid and powder paint and coating formulations often exhibit poor dispersion. Besides affecting the aesthetics of the resulting cured coating, poor dispersion prevents optimum localization of microcapsules within the cured coating. In the case of self-healing materials for example, such poor dispersion may prevent microcapsules from being available close to a damaged region of the material so that they may be recruited into action during a healing event. Poor dispersion also often leads to difficulties in paint application. This is particularly the case in powder coatings when poor dispersion due to aggregated microcapsules may lead to clogging of the coating applicator.

Generally, poor microcapsule dispersion stems from five primary sources. Sometimes, the microcapsules may agglomerate due to hydrogen bonding and/or covalent bonding that occurs when microcapsules come in contact with each other during the encapsulation process. The microcapsules also may aggregate after completion of the encapsulation procedure due to residual emulsifier on the outer surface of the shell wall. Sometimes, the microcapsules may aggregate after completion of the encapsulation procedure due to deposition of free microcapsule core on the outer surface of the shell wall. The microcapsules also may aggregate in their dry form due to static interaction. Finally, the microcapsules may aggregate upon incorporation into a coating formulation due to a lack of surface property compatibility between the capsule shell wall and the coating formulation.

The typical remedy for microcapsule aggregation uses mechanical agitation to loosen the aggregates and promote dispersion. However, the shear forces involved in mechanical agitation may damage the microcapsules, rendering them useless in self-healing and other applications.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1A:
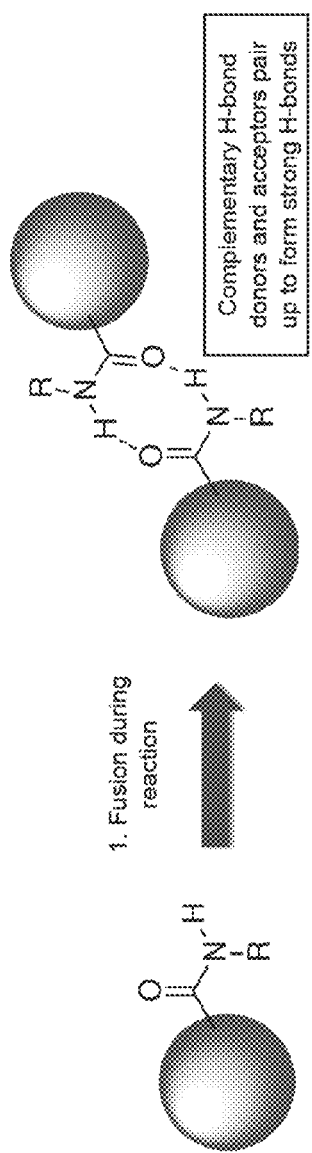
FIGS. 1A and 1B illustrate two mechanisms by which microcapsules may form aggregates during microencapsulation, wherein complementary hydrogen bond donors and acceptors pair up to form strong hydrogen bonds (FIG. 1A), and wherein hydrogen bonding occurs via water molecule linkages (FIG. 1B), in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments herein provide compositions and methods for increasing microcapsule dispersion in self-healing coating applications. For instance, various embodiments provide compositions and methods for non-covalent functionalization of polymeric microcapsule shell walls. In various embodiments, such non-covalent functionalization may improve microcapsule dispersion in polymeric material formulations.

Microcapsules may be used as a component of various self-healing materials, which term refers to a class of smart materials with the capability to repair themselves automatically without any external intervention. In various embodiments, when microcapsule-based self-healing materials are damaged, the microcapsules may be ruptured, and a healing agent contained therein may be released into the site of damage. Once released, the healing agent may polymerize, healing the damage and restoring at least some of the original mechanical properties of the original material. However, such microcapsules often exhibit poor dispersion within the coating, which may adversely affect the self-healing properties of the material. For example, poorly dispersed microcapsules may not be available near a damaged coating region, and thus may not be able to perform their healing functions.

In various embodiments, the disclosed compositions and methods may be used to increase microcapsule availability at a site of damage by increasing microcapsule dispersion within a coating. In various embodiments, the microcapsules disclosed herein may be non-covalently functionalized microcapsules having any of various shell wall chemistries, such as polymers, acrylates, epoxies, ceramics, or metals. These non-covalently functionalized microcapsules may exhibit improved dispersion in a wide range of liquid and powder coatings.

The microcapsules may be functionalized in accordance with various embodiments by using dispersants that are added to the encapsulation process at an optimal point after the shell wall has just begun to form. In some embodiments, the dispersants may be capable of penetrating the lipid bi-layer afforded by the emulsifier used in the encapsulation process, and may thereby adsorb to the surface of the newly formed shell wall. In various embodiments, adsorption to the surface may subsequently prevent the tendency for microcapsules to aggregate together during the encapsulation process, and may improve the dispersion of the microcapsules in various paints and coatings.

In various embodiments, non-covalent functionalization of the microcapsule shell wall surface may be used with various types of shell walls, such as polymers, epoxies, acrylates, ceramics, and metals, and may employ steric hindrance to prevent aggregation and maintain separation between adjacent microcapsules during the encapsulation process, thereby promoting compatibility with the paint formulation. In various embodiments, this surface modification of the shell walls may be maintained during the microcapsule isolation process (filtration and spray-drying), and in some embodiments, the resulting surface modification may facilitate dispersion within the coating and may survive the curing process without introducing adverse reactivity.

Thus, disclosed in various embodiments are non-covalently functionalized microcapsules for improved dispersion in coatings, in which the improved dispersion may stem from the ability to prevent the capsules from aggregating in the first place and to remain separated during the encapsulation process. One specific, non-limiting example of a microencapsulation process used for the preparation of poly(oxymethylene urea) microcapsules is outlined in relevant part below. Briefly, the core material to be encapsulated was added to a mixture of an emulsifier, water, and urea to form an oil-in-water emulsion in acidic pH conditions. To create reaction conditions suitable for the initiation of shell wall formation, the second reactant, formaldehyde, was then added and the temperature was gradually increased, typically at a rate of 1° C./minute, to promote interfacial polymerization to form the shell wall. This process is described in greater detail in Brown et al., "In Situ Poly (urea-formaldehyde) microencapsulation of dicyclopentadiene," *Journal of Microencapsulation* 2003, 20, 719 -730, which is hereby incorporated by reference. Although these reaction conditions are suitable for forming a plurality of poly(oxymethylene urea) microcapsules, one of skill in the art will appreciate that suitable reaction conditions will differ depending on the chemistry of the shell wall being formed. Methods of making microcapsules from a wide range of materials are well known in the art. As such, reaction conditions suitable for the initiation of shell wall formation and for forming a plurality of microcapsules will be specific to the chemistry of the microcapsules being formed, and will be known to one of skill in the art.

Figure 1B:
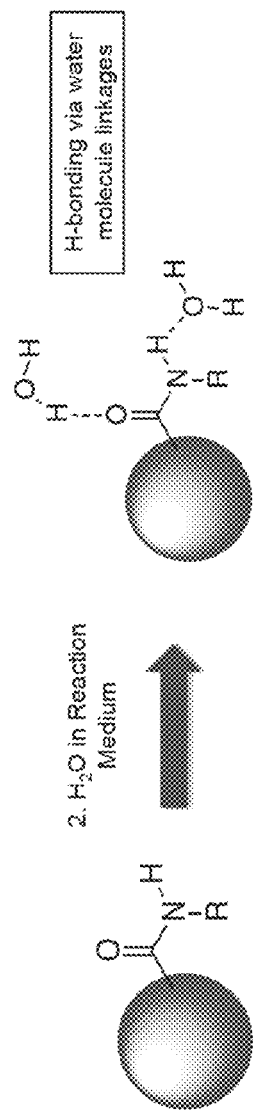

In various embodiments, during the formation of the shell wall in a microencapsulation process such as described above, polymerization reaction by-products may react to form covalent linkages between capsules, leading to agglomeration. FIGS. 1A and 1B illustrate two mechanisms of aggregation of microcapsules during microencapsulation, wherein complementary hydrogen bond donors and acceptors pair up to form strong hydrogen bonds (FIG. 1A), and wherein hydrogen bonding occurs via water molecule linkages (FIG. 1B), in accordance with various embodiments.

Thus, in various embodiments, one or more solid and/or liquid dispersants may be added during shell wall formation in order to increase dispersion. In various embodiments, dispersants of use in the disclosed compositions and methods may share properties that make them uniquely compatible with microencapsulation processes, and that yield microcapsules with poly(oxymethylene urea), poly (oxymethylene melamine), polyurethane, polyurea and combinations of these polymers as the resulting shell wall. Several of those properties of the dispersants of use are discussed below.

The Hydrophilic-Lipophilic Balance (HLB)

The HLB is calculated using the following equation: HLB=20 (Mh/M), where Mh is the molecular weight of the hydrophilic portion of the dispersant, and M is molecular weight of the entire molecule. In various embodiments, an HLB value in the range of 10-16 was found to be most compatible with commonly used emulsifiers. In various embodiments, the dispersant may have sufficient hydrophilic functional groups to form hydrogen bonds with polar groups present on the capsule surface due to the shell wall and the surfactant used (amide functionality from the shell wall and carboxylate functionality from the surfactant). Additionally, in various embodiments, maximization of the concentration of hydrophilic functional groups in the dispersant, may be balanced by a sufficient number of lipophilic groups to increase compatibility with solvent-based and generally hydrophobic paint formulations. The balance may be indicated by considering an HLB value of 10. Using the formula above, an HLB of 10 indicates an equal mass of hydrophilic and lipophilic functional groups.

Charge Compatibility

Chemistry

In various embodiments, ethoxy-functionalized dispersants such as ethoxylated polyethylene, amines, hydroxyls, phosphates, phenols and various functionalized esters of phosphoric acid derivatives show adequate affinity for the shell wall chemistries described above, as well as compatibility with common emulsifiers, which compatibility may be necessary for migration through the emulsifier for functionalization of the shell wall.

Molecular Weight

In various embodiments, a molecular weight in the range of 400 g/mol to 1200 g/mol was found to minimally affect the performance of the emulsifier.

Phase

In various embodiments, the dispersants used may be liquid or solid. Generally, in the liquid phase, they may be soluble in water, and in the solid phase, they may be able to break down under shear to form nanoparticle suspensions in water. In various embodiments, solid dispersants may be functionalized silicas, clays, and oxides that upon shear break down to form nano-scale materials that can pass through the emulsifier to deposit on the forming shell wall.

EXAMPLES

Example 1

Dynamics of Shell Wall Formation

In various embodiments, using the microencapsulation approach outlined above based on poly(oxymethylene urea) shell walls, several microencapsulation reactions were performed to determine the exact time during the reaction that shell wall formation began. Shell wall formation was observed to begin between 40 and 50 minutes after adding the formaldehyde when the temperature had reached about 45° C. At this point, the first of three aliquots of the relevant dispersant was added, and the remaining two were added in 1 hour intervals after the first. The total amount of active dispersant ingredient used was 1.7 wt % of the total microcapsule concentration. The rest of the reaction was allowed to proceed as described by Brown et al., "In Situ Poly (urea-formaldehyde) microencapsulation of dicyclopentadiene," *Journal of Microencapsulation* 2003, 20, 719-730.

Figure 2:
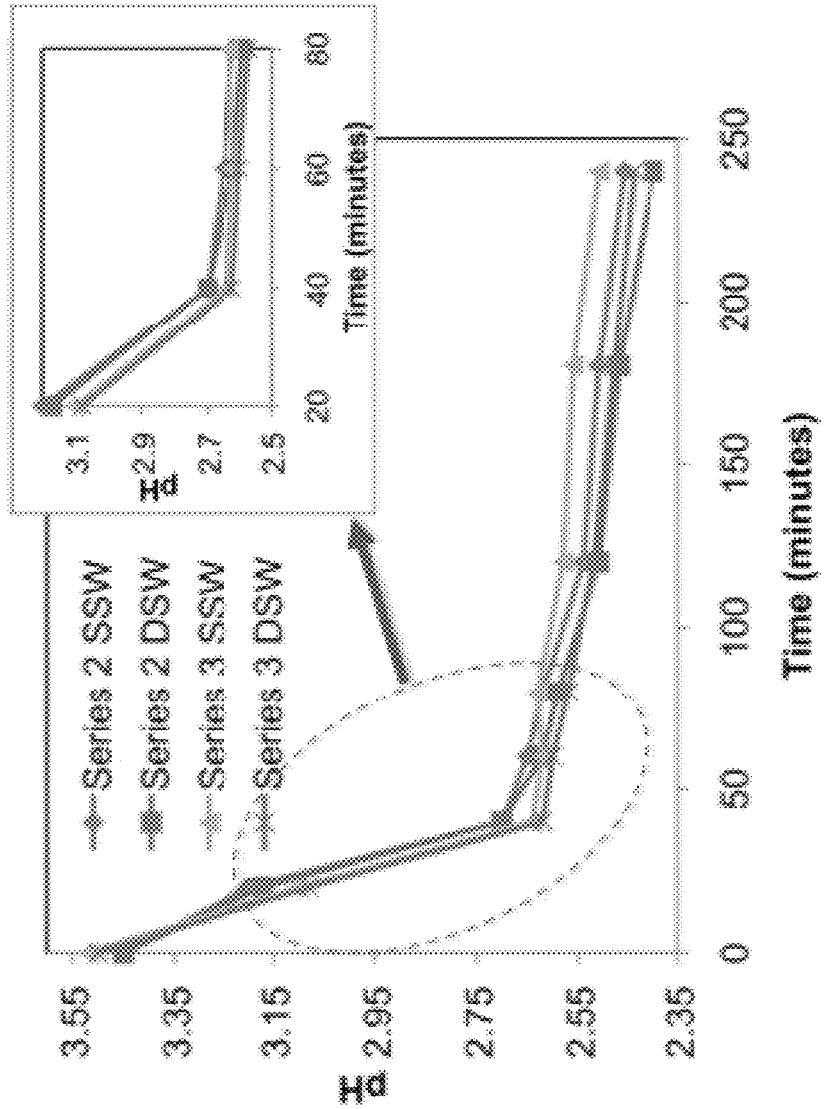
FIG. 2 is a graph illustrating the change in pH as a function of time for four different encapsulation reactions, wherein analysis of the reaction kinetics shows that the encapsulation of Series 3 (both single shell wall (SSW) and double shell wall (DSW)) microcapsules proceeds at a faster rate than that of Series 2 (both SSW and DSW) microcapsules; in accordance with various embodiments.

In various embodiments, the point of addition of the first aliquot of dispersant may be important to ensure minimal to no aggregation of the capsules. A closer evaluation of four different encapsulation reactions (producing Series 2 single shell wall (SSW), Series 2 double shell wall (DSW), Series 3 SSW and Series 3 DSW) indicated that the optimum point of the addition of the dispersant correlates with a shell wall conversion point of about 70%. The optimum point of conversion was determined by measuring the pH of the encapsulation reaction mixture for the duration of the reaction. FIG. 2 is a graph illustrating the change in pH as a function of time for four different encapsulation reactions, wherein analysis of the reaction kinetics shows that the encapsulation of Series 3 microcapsules proceeds at a faster rate than that of Series 2 microcapsules. The first measurement (t=0) was taken immediately after adding formaldehyde and a pH of about 3.50 was recorded in all experiments. The pH rapidly dropped from 3.50 to between 2.60 and 2.75, a range representing approximately 70% monomer conversion for all the reactions studied.

Figures 3A, 3B:
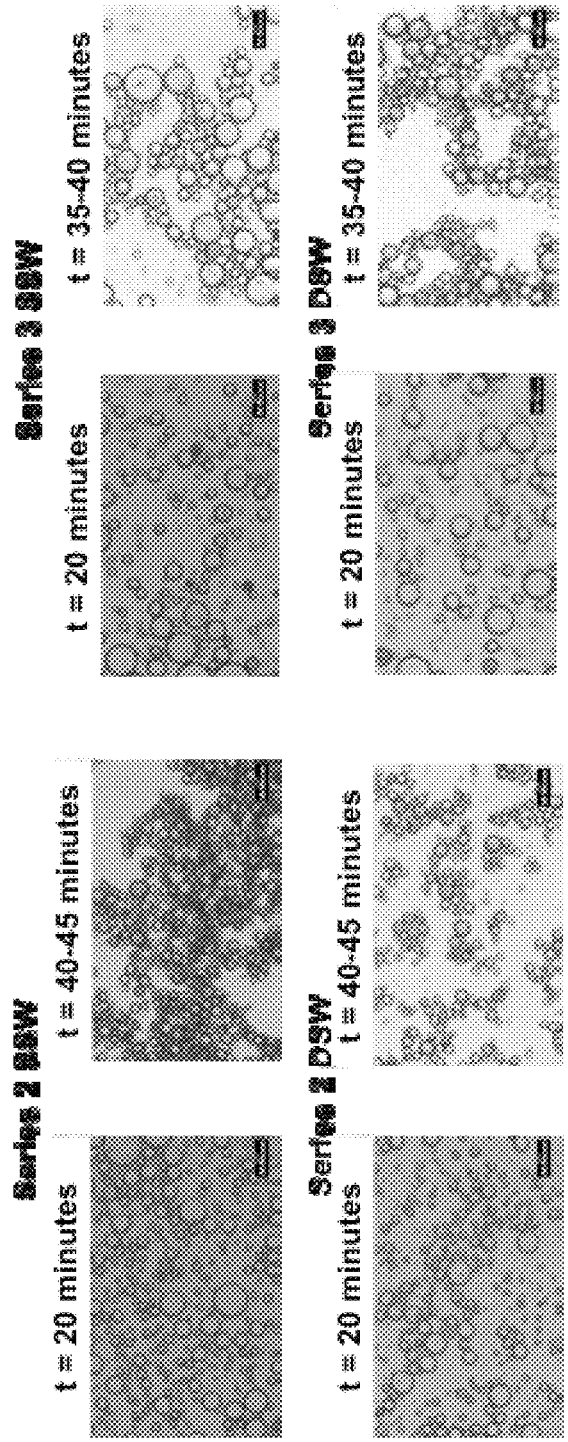
FIGS. 3A and 3B include a series of panels showing a comparison of microcapsule appearance for four different encapsulation reactions including two reactions with Series 2 (FIG. 3A) and two reactions with Series 3 (FIG. 3B), wherein the particles are still translucent emulsion droplets at t=20 minutes, and wherein the emulsion droplets become less translucent when a shell wall begins to form (t=40-45 minutes for Series 2, and 35 to 40 minutes for Series 3), in accordance with various embodiments.
Figure 4B:
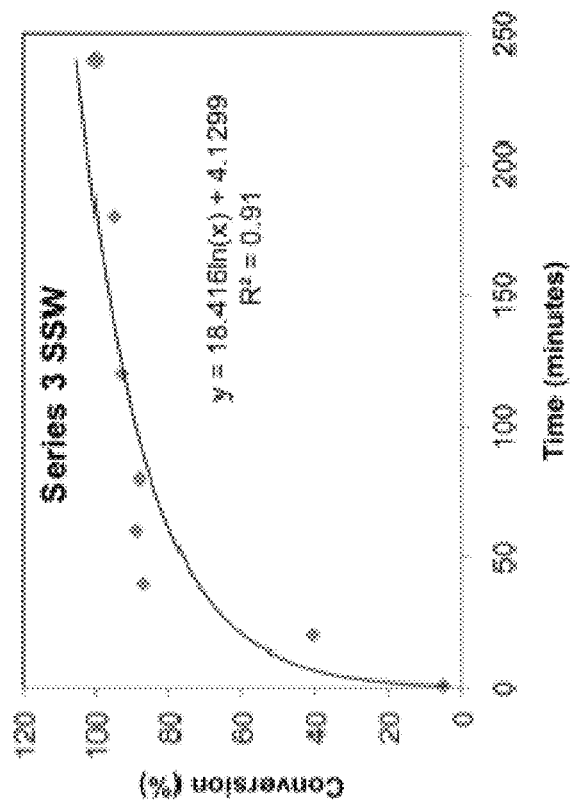
FIGS. 4A and 4B are two graphs showing the extent of reaction for Series 2 SSW (FIG. 4A) and Series 3 SSW (FIG. 4B), in accordance with various embodiments.
Figure 4A:
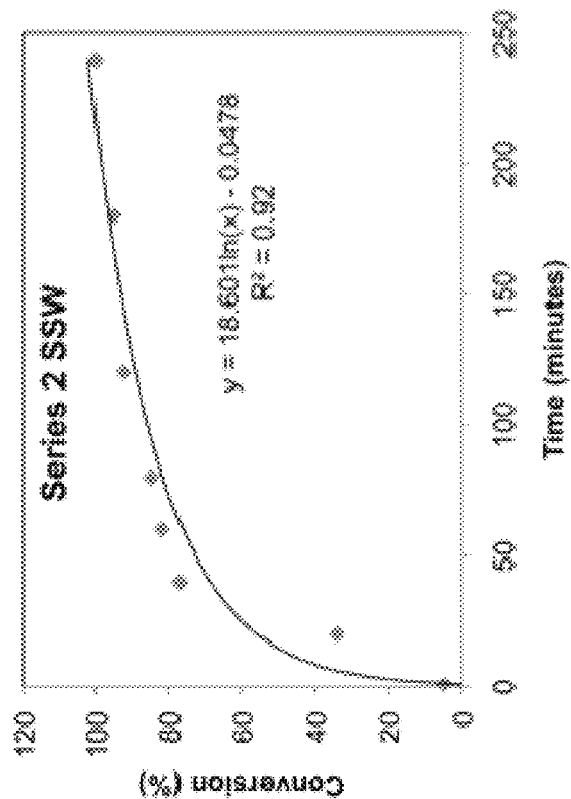

Optical microscopy confirmed the formation of polymeric shell walls on the surface of emulsion particles present in the reaction mixture. FIGS. 3A and 3B include a series of panels showing a comparison of microcapsule appearance for four different encapsulation reactions including two reactions with Series 2 (FIG. 3A) and two reactions with Series 3 (FIG. 3B), wherein the particles are still translucent emulsion droplets at t=20 minutes, and wherein the emulsion droplets become less translucent when a shell wall begins to form (t=40-45 minutes for Series 2, and 35 to 40 minutes for Series 3). A comparison of optical microscopy images obtained from aliquots taken out of the reaction mixture at a pH of about 3.1 (see inset of FIG. 2) to those obtained from aliquots taken out at a pH of between 2.6 and 2.7 also showed the transition from emulsion particles which are primarily translucent to microcapsules with thin shell walls that are much less translucent at this same time point. FIGS. 4A and 4B are two graphs showing the extent of reaction for Series 2 SSW (FIG. 4A) and Series 3 SSW (FIG. 4B). These conversion plots were prepared by estimating the encapsulation reaction to be at 100% conversion at the end of the reaction.

The encapsulation reaction for Series 3 was found to proceed at a slightly faster rate relative to Series 2, necessitating a modification of the procedure described above for functionalizing Series 2 microcapsules to perform similar functionalization of Series 3. Additionally, encapsulations using double shell wall materials also proceed at a slightly faster rate than standard SSW capsules. Regardless of the rate of the reaction, the type of capsule (SSW or DSW) used or the core material used (Series 2 or 3), the dispersants should be added at or just prior to the shell wall reaching 70% conversion, such as about 60-70% conversion, or about 65-68% conversion. Beyond the 70% conversion point, the rate of the reaction slows down (see, e.g., FIG. 4) and the capsules have a tendency to fuse together (most likely covalently) as a higher extent of conversion is achieved without the incorporation of dispersants.

Figure 5:
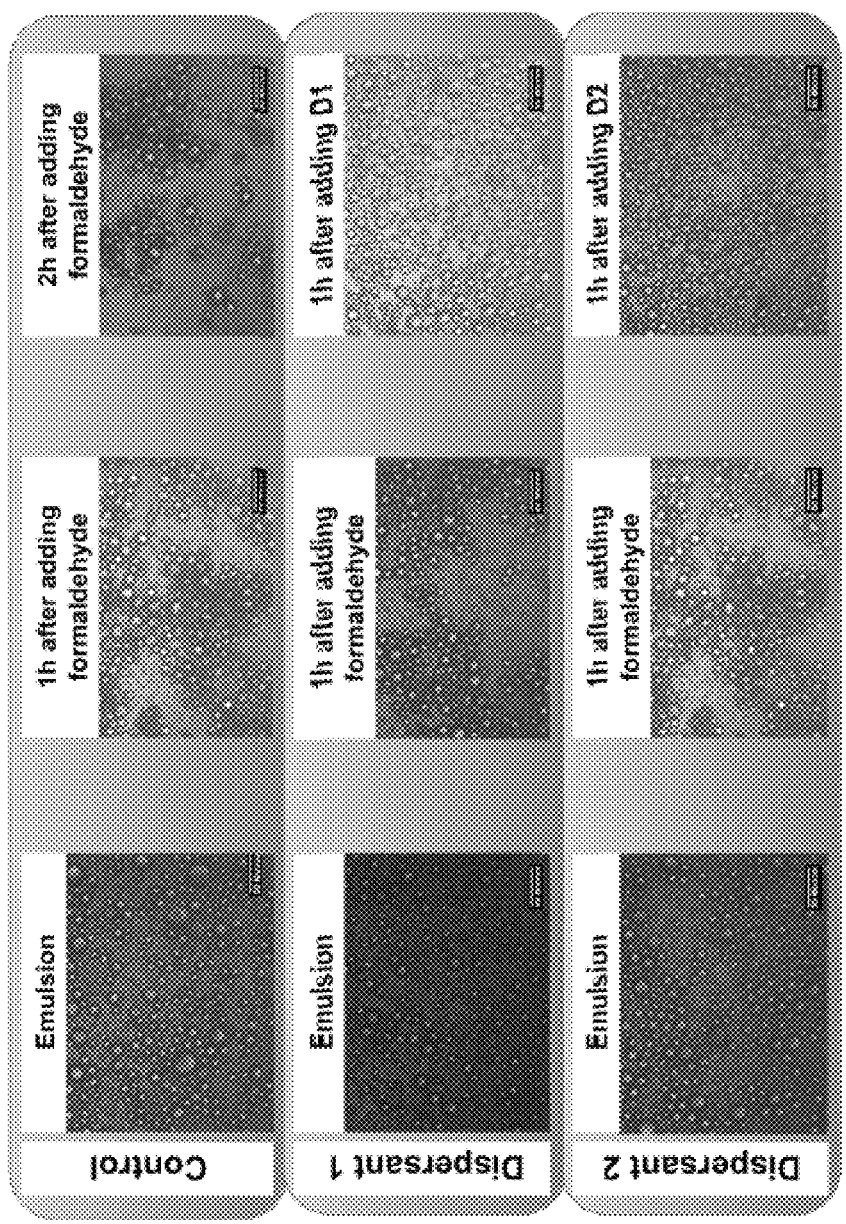
FIG. 5 is a series of six panels illustrating capsule separation during microencapsulation, and demonstrating that improved separation is observed in cases in which a dispersant is used, such as Dispersant 1 (D1) and Dispersant 2 (D2), both of which are liquid non-ionic polyethylene oxide-based dispersants, in accordance with various embodiments.

The addition of two additional aliquots of dispersant in 1 hour intervals after the first ensures that while shell wall conversion proceeds the dispersant is being adsorbed to the surface of the microcapsules thereby minimizing the likelihood of aggregation or fusion of capsule shell walls. When a dispersant is used, the improvement in microcapsule separation is evident in comparison to the control, which was not treated with dispersant. FIG. 5 is a series of six panels illustrating capsule separation during microencapsulation, and demonstrating that improved separation is observed in cases in which a dispersant is used, such as Dispersant 1 (D1) and Dispersant 2 (D2), both of which are liquid non-ionic polyethylene oxide-based dispersants.

Example 2

Microcapsule Isolation and Evaluation of Dispersion

After completion of the microencapsulation reaction, the microcapsules were subjected to several filtration and rinsing cycles with deionized water to remove any excess emulsifier or dispersant. Water was then added to the filtered capsules to form a slurry of about 25 wt % microcapsules in deionized water. The capsules were then recovered from this slurry via spray-drying. The dispersion of the resulting spray-dried capsules was then evaluated in a representative set of coatings that included an epoxy (see, e.g., FIG. 6), an alkyd (see, e.g., FIG. 7), an acrylic (see, e.g., FIG. 8) and a urethane (see, e.g., FIG. 9). A Hegman gauge was used to evaluate the improvement in dispersion. Each of the coatings was evaluated as described below.

Example 3

Dispersion Improvement in an Epoxy Primer

Figure 6C:
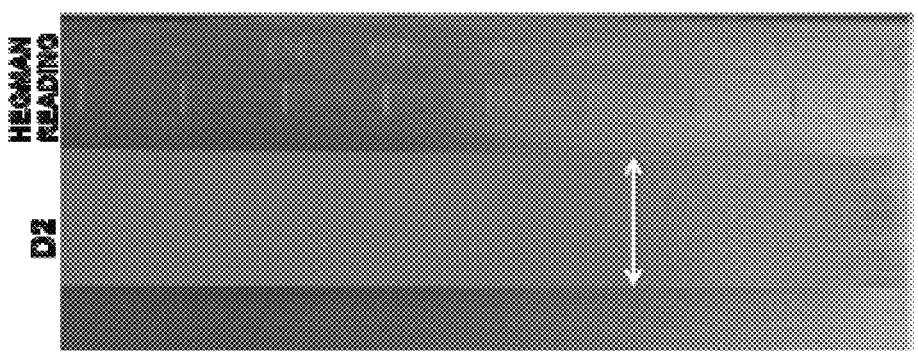
FIGS. 6A-6C illustrate a comparison of the dispersion of dispersant-treated poly(oxymethylene urea) microcapsules D1 (FIG. 6B) and D2 (FIG. 6C) relative to a control (FIG. 6A; untreated) in an epoxy primer coating, in which the Hegman rating was observed to improve from about 3 to between 5 and 6, representing an 80% improvement over the control, and in which the neat coating without any microcapsules incorporated exhibited a Hegman rating of 6, in accordance with various embodiments.
Figure 6B:
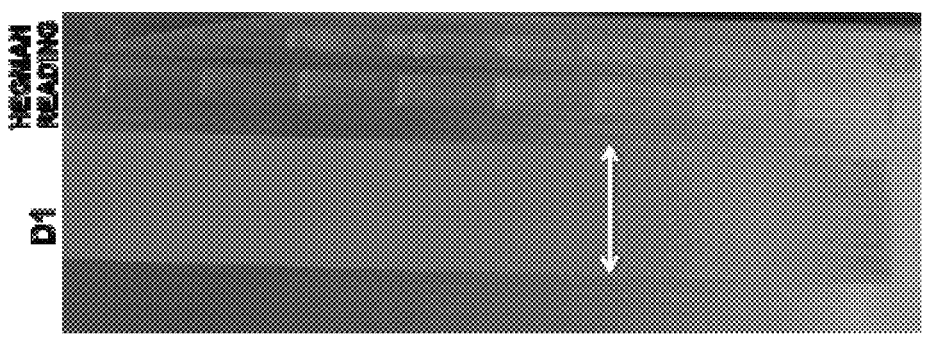
Figure 6A:
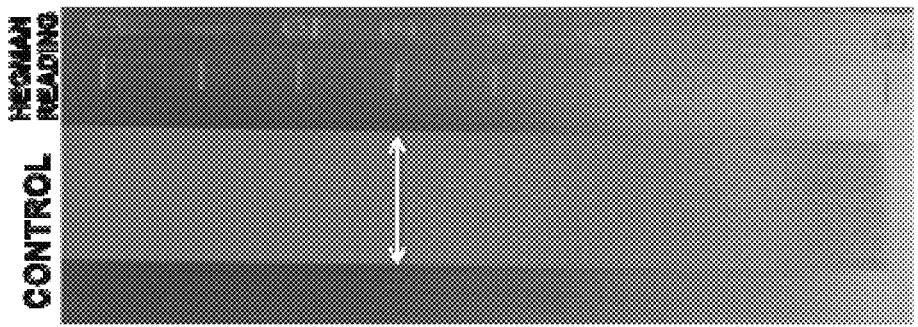

FIGS. 6A-6C illustrate a comparison of the dispersion of dispersant-treated poly(oxymethylene urea) microcapsules D1 (FIG. 6B) and D2 (FIG. 6C) relative to a control (FIG. 6A; untreated) in an epoxy primer coating. The Hegman rating was observed to improve from about 3 to between 5 and 6 in the dispersant-treated microcapsules, representing an 80% improvement over the control. By comparison, the neat coating without any microcapsules incorporated exhibited a Hegman rating of 6.

Example 4

Dispersion Improvement in an Alkyd Primer

Figure 7C:
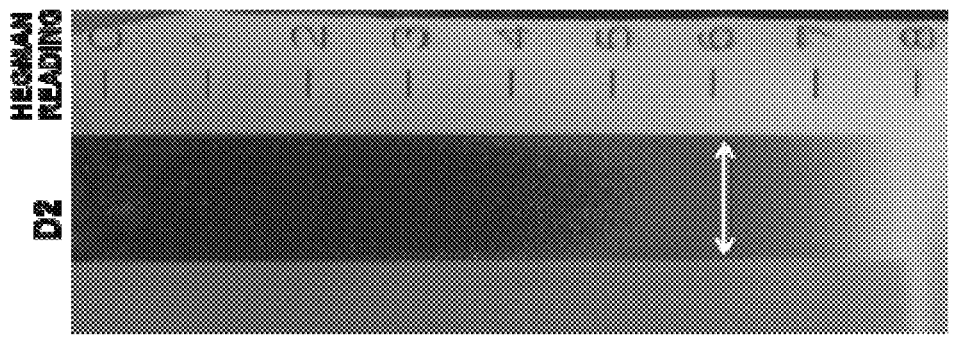
FIGS. 7A-7C illustrate a comparison of the dispersion of dispersant-treated poly(oxymethylene urea) microcapsules D1 (FIG. 7B) and D2 (FIG. 7C) relative to a control (FIG. 7A; untreated) in an alkyd primer, in which the Hegman rating was observed to improve from between 5 and 6 to just over 6, in which the control in this case exhibited good dispersion, wherein an improvement of about 15% relative to the control was observed, and wherein the neat coating without any microcapsules incorporated exhibited a Hegman rating of 7, in accordance with various embodiments.
Figure 7B:
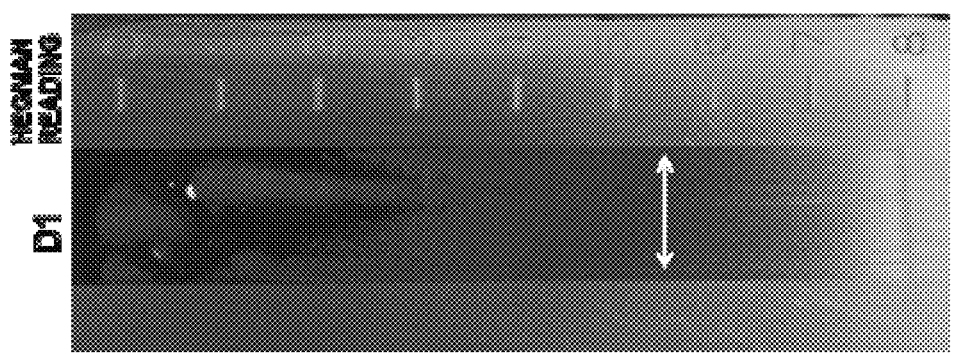
Figure 7A:
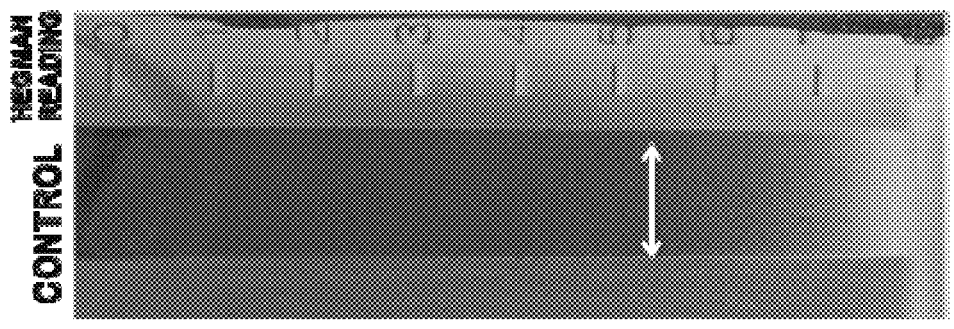

FIGS. 7A-7C illustrate a comparison of the dispersion of dispersant-treated poly(oxymethylene urea) microcapsules D1 (FIG. 7B) and D2 (FIG. 7C) relative to a control (FIG. 7A; untreated) in an alkyd primer. The Hegman rating was observed to improve from between 5 and 6 to just over 6 in the dispersant-treated microcapsules. In the control primer, good dispersion was seen. Thus, an improvement of about 15% relative to the control was observed. By comparison, the neat coating without any microcapsules incorporated exhibited a Hegman rating of 7.

Example 5

Dispersion Improvement in a Water-Based Acrylic Coating

Figure 8C:
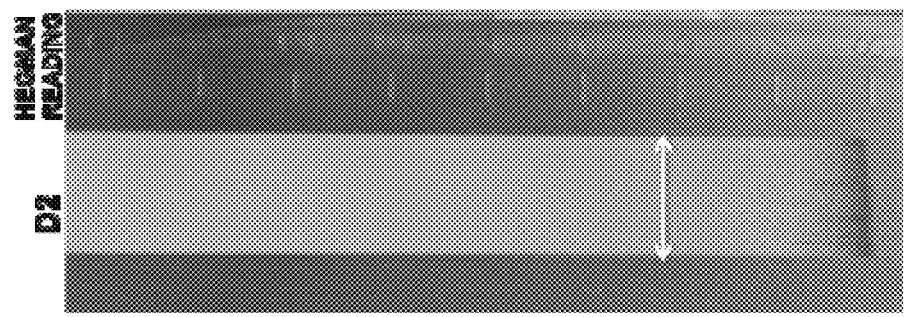
FIGS. 8A-8C illustrate a comparison of the dispersion of dispersant-treated poly(oxymethylene urea) microcapsules D1 (FIG. 8B) and D2 (FIG. 8C) relative to a control (FIG. 8A; untreated) in a water-based acrylic top coat, in which the Hegman rating was observed to improve from just over 4 to almost 6 in the case of D2, representing an improvement of about 40%, and in which the neat coating without any microcapsules incorporated exhibited a Hegman rating of 7, in accordance with various embodiments.
Figure 8B:
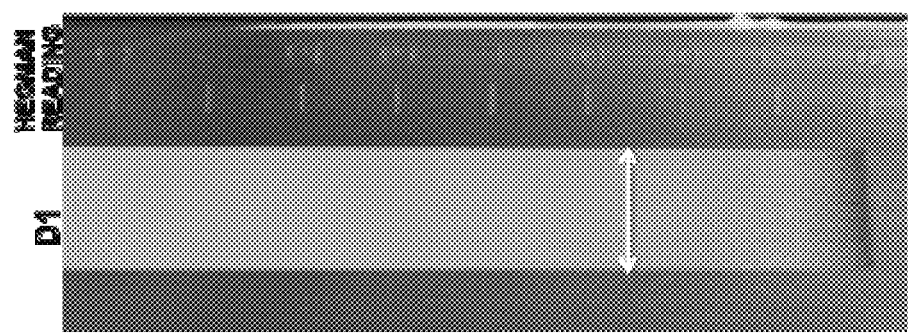
Figure 8A:
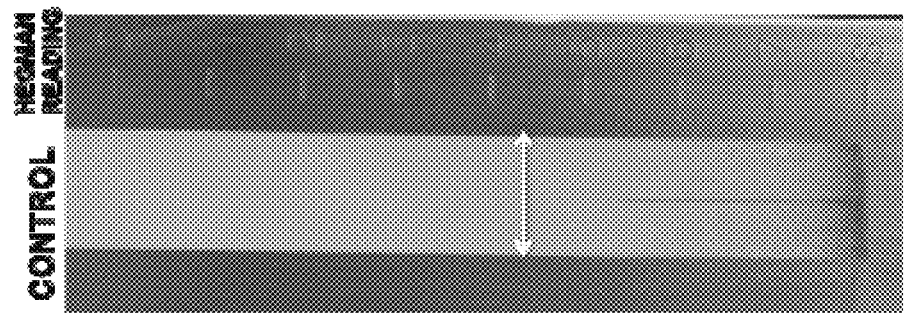

FIGS. 8A-8C illustrate a comparison of the dispersion of dispersant-treated poly(oxymethylene urea) microcapsules D1 (FIG. 8B) and D2 (FIG. 8C) relative to a control (FIG. 8A; untreated) in a water-based acrylic top coat. The Hegman rating was observed to improve from just over 4 to almost 6 in the case of D2, representing an improvement of about 40%. By comparison, the neat coating without any microcapsules incorporated exhibited a Hegman rating of 7.

Example 6

Dispersion Improvement in a Polyurethane Coating

Figure 9C:
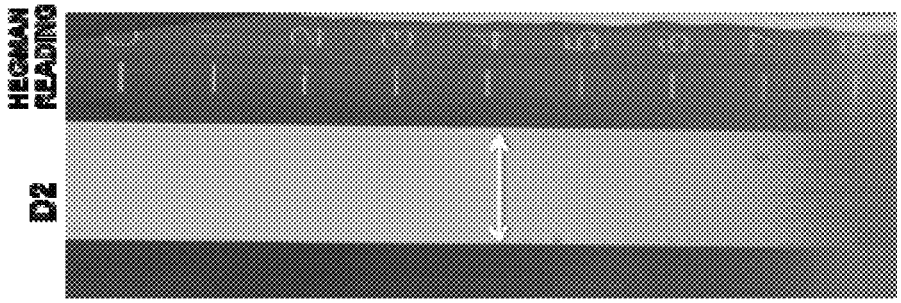
FIGS. 9A-9C illustrate a comparison of the dispersion of dispersant-treated poly(oxymethylene urea) microcapsules D1 (FIG. 9B) and D2 (FIG. 9C) relative to a control (FIG. 9A; untreated) in an elevated temperature-cured polyurethane coating, in which the Hegman rating was observed to improve from between 2 and 3 to almost 5 in the case of D1, representing an improvement of about 100%, and in which the neat coating without any microcapsules incorporated exhibited a Hegman rating of 6, in accordance with various embodiments.
Figure 9B:
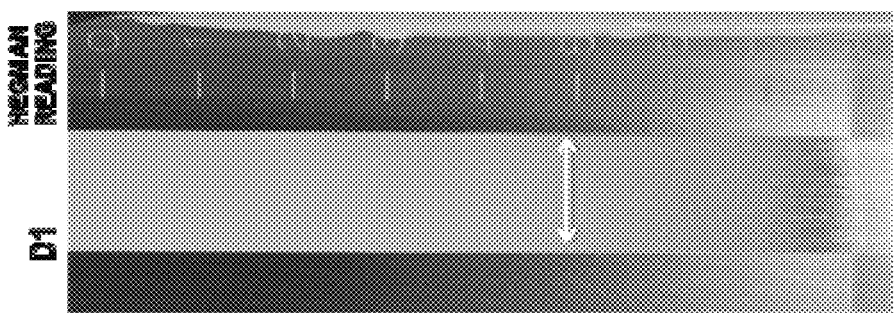
Figure 9A:
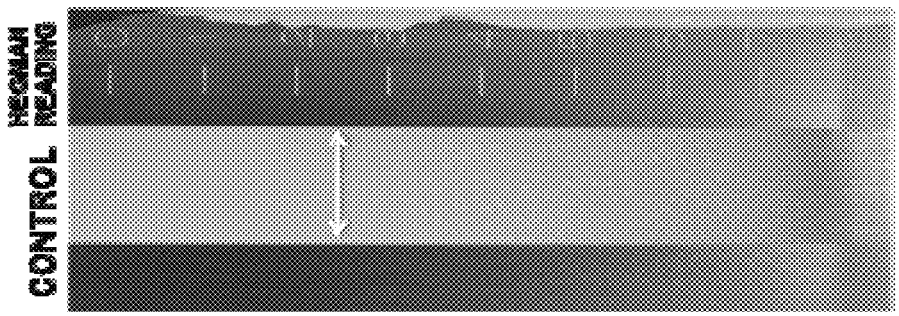

FIGS. 9A-9C illustrate a comparison of the dispersion of dispersant-treated poly(oxymethylene urea) microcapsules D1 (FIG. 9B) and D2 (FIG. 9C) relative to a control (FIG. 9A; untreated) in an elevated temperature-cured polyurethane coating. The Hegman rating was observed to improve from between 2 and 3 to almost 5 in the case of D1, representing an improvement of about 100%. By comparison, the neat coating without any microcapsules incorporated exhibited a Hegman rating of 6.

Example 7

Functionalization and Evaluation of Double Shell Wall Capsules

The same concepts described above for functionalization of a poly(oxymethylene Urea) capsule shell wall also are effective for functionalization of a double shell wall capsule. Double shell wall capsules are typically used when the combination of shell walls provides properties not seen in individual shell walls, such as an improvement in thermal properties.

Figure 10B:
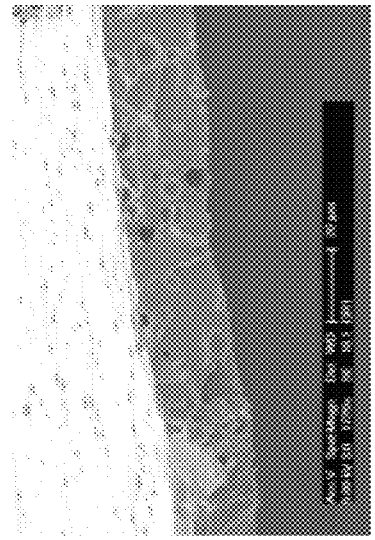
FIGS. 10A-10C illustrate a comparison of the dispersion of double shell wall capsules in an epoxy coating film, wherein more aggregated capsules are visible on the surface and in the cross-section of the sample containing untreated double shell wall capsules (FIG. 10A; control), showing that the capsules on the surface and in the cross-section of samples containing capsules treated with dispersants D1 (FIG. 10B) and D2 (FIG. 10C) are better dispersed, in accordance with various embodiments.
Figure 10C:
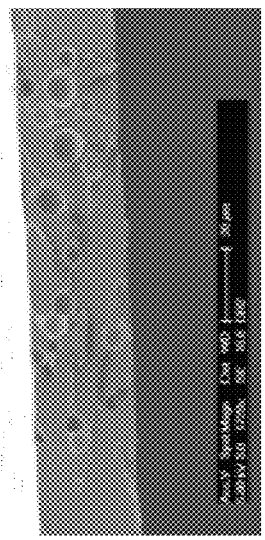
Figure 10A:
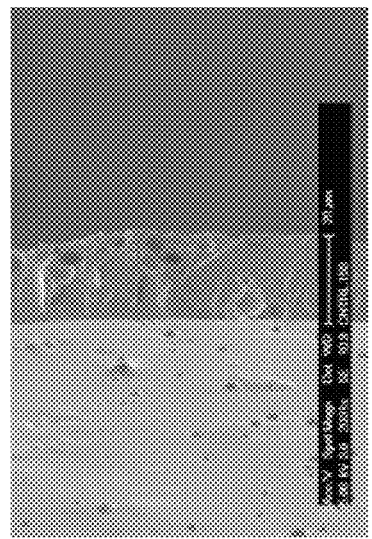

Double shell wall capsules were treated with either dispersant D1 or dispersant D2 during the encapsulation process as outlined above for single shell wall capsules. FIGS. 10A-10C illustrate a comparison of the dispersion of double shell wall capsules in an epoxy coating film, wherein more aggregated capsules are visible on the surface and in the cross-section of the sample containing untreated double shell wall capsules (FIG. 10A; control), showing that the capsules on the surface and in the cross-section of samples containing capsules treated with dispersants D1 (FIG. 10B) and D2 (FIG. 10C) are better dispersed.

Figure 11:
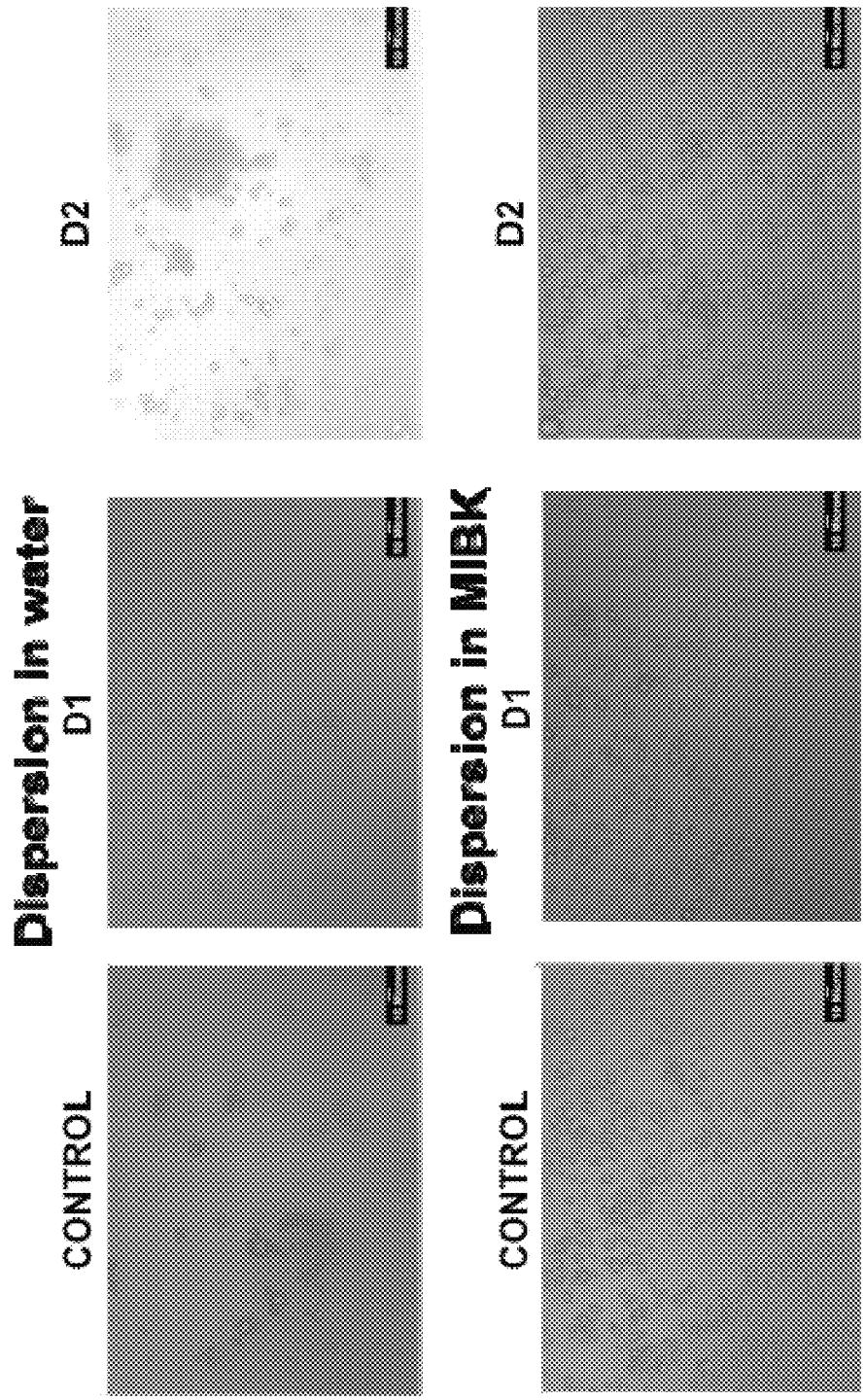
FIG. 11 illustrates a series of six panels showing a comparison of the dispersion of untreated (control) capsules and capsules treated with dispersants D1 and D2 in water and MIBK, in accordance with various embodiments.
Figures 12A, 12B, 12C:
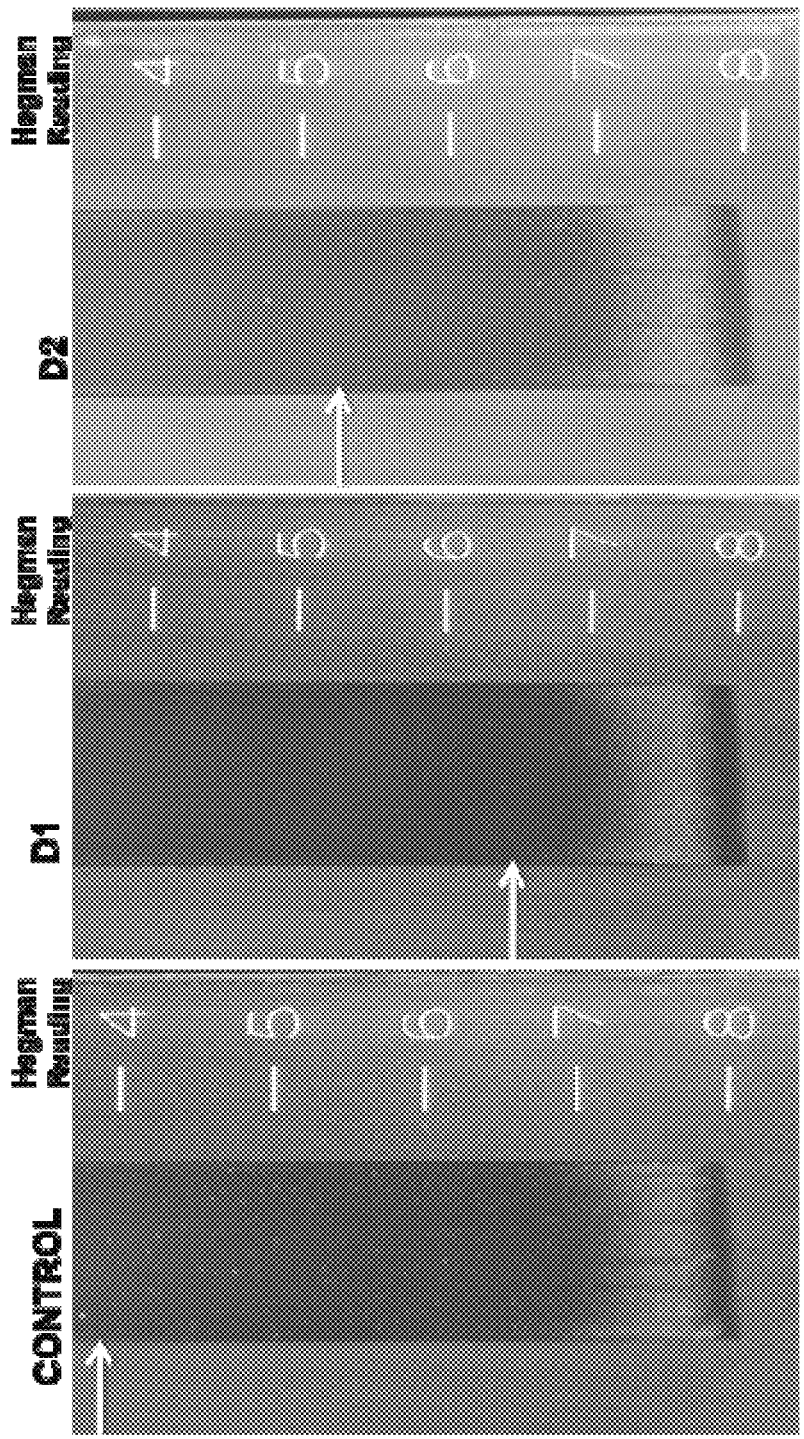
FIGS. 12A-12C illustrate a comparison of the dispersion of dispersant-treated poly(oxymethylene urea)-polyurethane double shell wall microcapsules D1 (FIG. 12B) and D2 (FIG. 12C) relative to a control (FIG. 12A; untreated) in an epoxy coating, in which the Hegman rating was observed to improve from about 4 to between 6 and 7 in the case of D1, representing an improvement of about 62.5%, and in which the neat coating without any microcapsules incorporated exhibited a Hegman rating of 7, in accordance with various embodiments.

FIG. 11 illustrates a series of six panels showing a comparison of the dispersion of untreated (control) capsules and capsules treated with dispersants D1 and D2 in water and methyl isobutyl ketone (MIBK). FIGS. 12A-12C illustrate a comparison of the dispersion of dispersant-treated poly(oxymethylene urea)-polyurethane double shell wall microcapsules D1 (FIG. 12B) and D2 (FIG. 12C) relative to a control (FIG. 12A; untreated) in a clear epoxy coating. The Hegman rating was observed to improve from about 4 to between 6 and 7 in the case of D1, representing an improvement of about 62.5%. By comparison, the neat coating without any microcapsules incorporated exhibited a Hegman rating of 7.

Example 8

Process Optimization for Double Shell Wall Synthesis Chemistry

In treating double shell wall capsules containing healing agents based on alkyd functionality (Series 3), it was observed that the shell wall formation in this particular encapsulation process occurred faster than it did in the case of a single wall capsule. In other words, the rate of polymerization of the shell wall monomers was quicker than in the case of a single wall encapsulation process leading to a higher degree of monomer conversion at the 40 to 50 minute mark, which is where the dispersant was added for a single wall capsule (see, e.g., FIG. 4). By this point in the process, some irreversible aggregation had already occurred. To remedy this observation, two changes to the process were made as follows.

Method 1: The dispersant (D2) was added at about 35 minutes after the addition of the final reactant, formaldehyde. This confirmed that determination of the optimum point for addition of the dispersant depends on degree of conversion of shell wall monomers to polymers, and not necessarily at a particular time, and that optimum point as shown in FIG. 4 and discussed earlier occurs at about 70% of shell wall conversion.

Method 2: In addition to adding the dispersant (D2) at about 30 minutes after adding formaldehyde, the concentration of the dispersant used was increased from 1.7 wt % to 2.5 wt % of the total microcapsule concentration.

For both methods 1 and 2, the resulting capsules were spray-dried at 150° C.

Figures 13A, 13B, 13C:
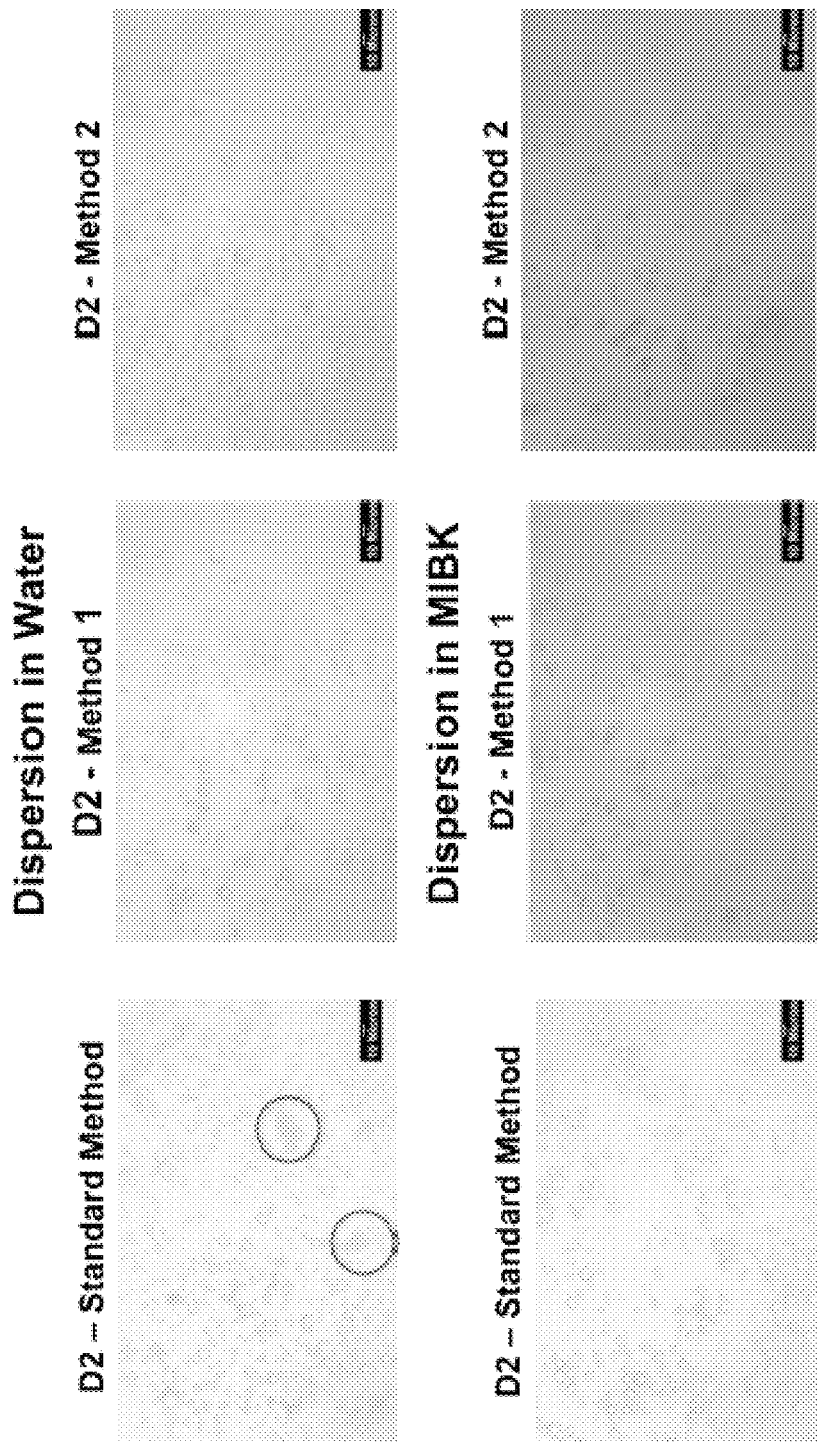
FIGS. 13A-13C illustrate poly(oxymethylene urea)-polyurethane double shell wall capsules, and compare D2-treatment using the standard method described above for single wall capsules (FIG. 13A) and D2-treatment via methods 1 (FIG. 13B) and 2 (FIG. 13C) described above, in which both methods 1 and 2 appear to lead to a significant improvement in dispersion, and wherein aggregated microcapsules are circled in FIG. 13A, in accordance with various embodiments.

FIGS. 13A-13C illustrate poly(oxymethylene urea)-polyurethane double shell wall capsules, and compare D2-treatment using the standard method described above for single wall capsules (FIG. 13A) and D2-treatment via methods 1 (FIG. 13B) and 2 (FIG. 13C) described above. Both methods 1 and 2 lead to a significant improvement in dispersion. Aggregated microcapsules are circled in FIG. 13A, which shows the preliminary capsules dispersed in water (FIG. 13, see circled regions of the image).

Figures 14A, 14B, 14C:
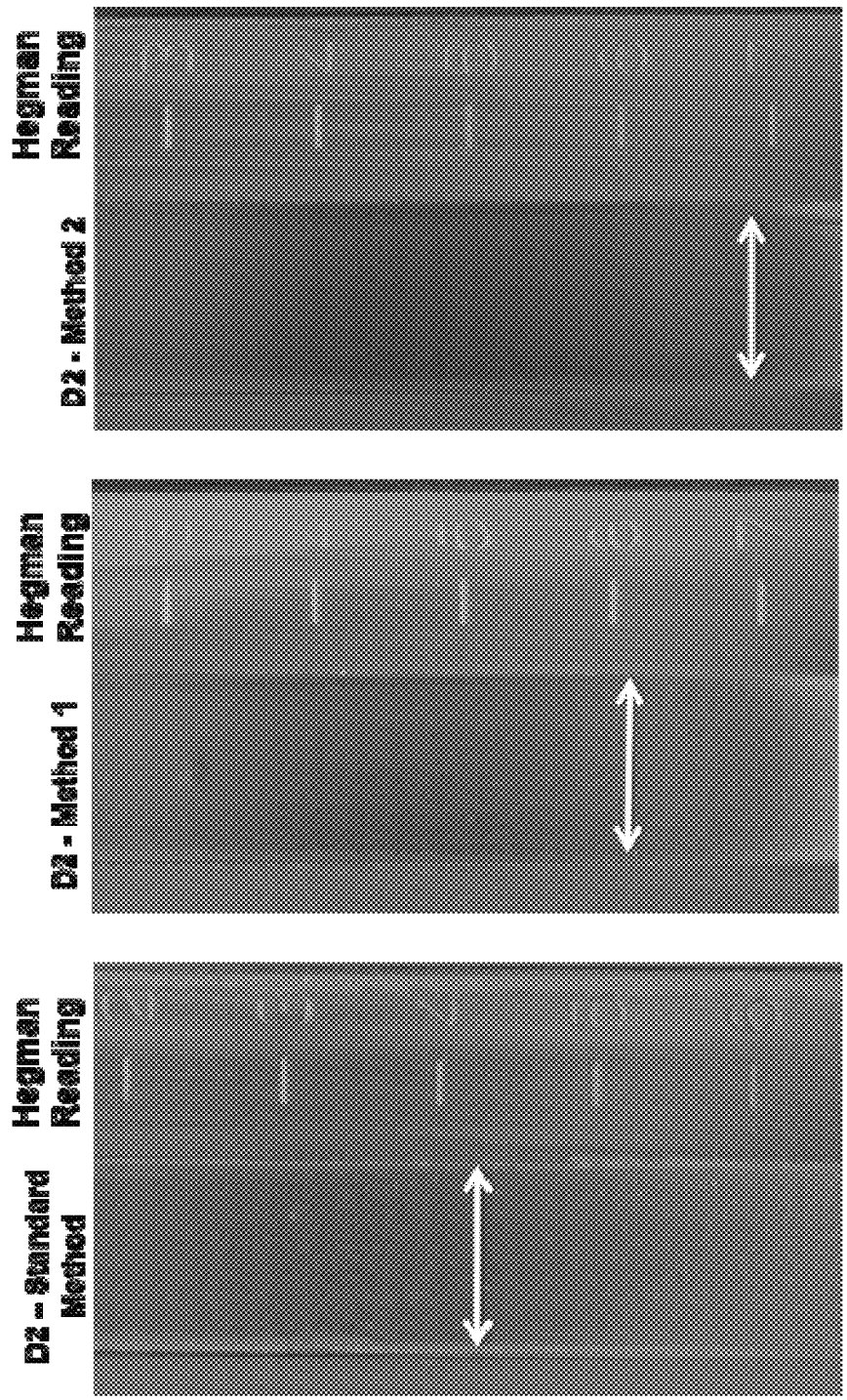
FIGS. 14A-14C illustrate a comparison of the dispersion in an epoxy coating of D2-treated poly(oxymethylene urea)-polyurethane double shell wall microcapsules (methods 1, FIG. 14B, and 2, FIG. 14C) relative to capsules treated with D2 using the standard method (FIG. 14A), in which the Hegman rating was observed to improve from just above 4 for the standard method to almost 7 for method 2 representing an additional improvement of about 60%, and in which the neat coating without any microcapsules incorporated exhibited a Hegman rating of 7, in accordance with various embodiments.

FIGS. 14A-14C illustrate a comparison of the dispersion in an epoxy coating of D2-treated poly(oxymethylene urea)-polyurethane double shell wall microcapsules (methods 1, FIG. 14B, and 2, FIG. 14C) relative to capsules treated with D2 using the standard method (FIG. 14A). The Hegman rating was observed to improve from just above 4 for the standard method to almost 7 for Method 2, representing an additional improvement of about 60%. By comparison, the neat coating without any microcapsules incorporated exhibited a Hegman rating of 7.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method of forming a microcapsule dispersion, comprising:
   providing a material capable of forming a plurality of microcapsules;
   adding an emulsifier to the material;
   initiating microcapsule formation in the material under reaction conditions sufficient to permit formation of the plurality of microcapsules; and
   adding one or more ethoxy-functionalized dispersants to the material before formation of the plurality of microcapsules is complete, wherein adding the one or more ethoxy-functionalized dispersants to the material before formation of the plurality of microcapsules is complete causes the ethoxy-functionalized dispersants to be incorporated into a microcapsule shell wall during formation of the plurality of microcapsules, thereby forming the microcapsule dispersion, wherein the ethoxy-functionalized dispersant is different from the emulsifier.

2. The method of claim 1, wherein providing a material capable of forming a plurality of microcapsules comprises providing a polymeric material capable of forming a plurality of microcapsules; wherein initiating microcapsule formation in the material comprises initiating polymerization of the polymeric material under reaction conditions sufficient to permit formation of the plurality of microcapsules, thereby forming a polymerizing polymeric material; and wherein adding one or more ethoxy-functionalized dispersant to the material before formation of the plurality of microcapsules is complete comprises adding one or more ethoxy-functionalized dispersants to the polymerizing polymeric material before formation of the plurality of microcapsules is complete.

3. The method of claim 2, wherein adding the ethoxy-functionalized dispersant to the polymerizing polymeric material before formation of the plurality of microcapsules is complete comprises non-covalently functionalizing a shell wall of a microcapsule.

4. The method of claim 2, wherein the polymeric material comprises poly(oxymethylene urea).

5. The method of claim 3, wherein adding the ethoxy-functionalized dispersant to the polymerizing polymeric material before formation of the plurality of microcapsules is complete comprises adsorbing the ethoxy-functionalized dispersant to the shell wall.

6. The method of claim 2, wherein adding the ethoxy-functionalized dispersant to the polymerizing polymeric material before formation of the plurality of microcapsules is complete comprises adding the ethoxy-functionalized dispersant at a time point representing between about 60-70% monomer conversion.

7. The method of claim 6, wherein adding the ethoxy-functionalized dispersant to the polymerizing polymeric material before formation of the plurality of microcapsules is complete comprises adding the ethoxy-functionalized dispersant at a time point representing between about 65-68% monomer conversion.

8. The method of claim 6, wherein adding the ethoxy-functionalized dispersant to the polymerizing polymeric material before formation of the plurality of microcapsules is complete comprises adding the ethoxy-functionalized dispersant at a time point representing at or just prior to 70% monomer conversion.

9. The method of claim 2, wherein adding the ethoxy-functionalized dispersant to the polymerizing polymeric material before formation of the plurality of microcapsules is complete comprises adding the ethoxy-functionalized dispersant when the pH of the polymerizing polymeric material is between about 2.60 and about 2.75.

10. The method of claim 2, wherein adding the ethoxy-functionalized dispersant to the polymerizing polymeric material before formation of the plurality of microcapsules is complete comprises adding the ethoxy-functionalized dispersant approximately 40 to 50 minutes after initiating polymerization of the polymeric material.

11. The method of claim 2, wherein the ethoxy-functionalized dispersant comprises at least one of the group consisting of an ethoxylated polyethylene, an ethoxylated amine, an ethoxylated hydroxyl, an ethoxylated phosphate, an ethoxylated phenol, and a functionalized ester of a phosphoric acid derivative.

12. The method of claim 2, wherein the ethoxy-functionalized dispersant comprises at least one of the group consisting of an ethoxy-functionalized silica, an ethoxy-functionalized clay, and an ethoxy-functionalized oxide; and wherein upon shearing, the ethoxy-functionalized silica, ethoxy-functionalized clay, or ethoxy-functionalized oxide breaks down to form a nano-scale material.

13. The method of claim 2, wherein the ethoxy-functionalized dispersant comprises a liquid non-ionic polyethylene oxide-based dispersant.

14. The method of claim 2, wherein the polymeric material comprises poly(oxymethylene urea), poly (oxymethylene melamine), polyurethane, polyurea, or a combination thereof.

15. The method of claim 2, wherein the ethoxy-functionalized dispersant has a Hydrophilic-Lipophilic Balance (HLB) value of from about 10 to about 16.

16. The method of claim 2, wherein the ethoxy-functionalized dispersant has a nonionic or cationic charge classification.

17. The method of claim 2, wherein the ethoxy-functionalized dispersant has a molecular weight of from about 400 g/mol to about 1200 g/mol.

18. The method of claim 2, wherein the ethoxy-functionalized dispersant is a liquid or solid.

19. The method of claim 15, wherein:
a. the ethoxy-functionalized dispersant has a nonionic or cationic charge classification;
b. the ethoxy-functionalized dispersant has a molecular weight of from about 400 g/mol to about 1200 g/mol; and/or
c. the ethoxy-functionalized dispersant is a liquid or solid.

20. The method of claim 19, wherein the ethoxy-functionalized dispersant has a nonionic or cationic charge classification; wherein the ethoxy-functionalized dispersant has a molecular weight of from about 400 g/mol to about 1200 g/mol; and wherein the ethoxy-functionalized dispersant is a liquid or solid.

21. A method of forming a microcapsule dispersion, comprising:
combining poly(oxymethylene urea), a core material to be encapsulated, an emulsifier, water, and urea in acidic pH conditions to form an oil-in-water emulsion;
adding formaldehyde to the oil-in-water emulsion to initiate polymerization;
increasing the temperature of the oil-in-water emulsion; and
adding an ethoxy-functionalized dispersant to the oil-in-water emulsion before polymerization is complete, thereby forming the microcapsule dispersion, wherein the ethoxy-functionalized dispersant is different from the emulsifier.

22. The method of claim 21, wherein adding the ethoxy-functionalized dispersant to the oil-in-water emulsion before polymerization is complete comprises adding the ethoxy-functionalized dispersant at a time point representing between about 60-70% monomer conversion.

23. The method of claim 22, wherein adding the ethoxy-functionalized dispersant to the oil-in-water emulsion before polymerization is complete comprises adding the ethoxy-functionalized dispersant at a time point representing between about 65-68% monomer conversion.

24. The method of claim 22, wherein adding the ethoxy-functionalized dispersant to the oil-in-water emulsion before polymerization is complete comprises adding the ethoxy-functionalized dispersant at a time point representing at or just prior to 70% monomer conversion.

25. The method of claim 21, wherein adding the ethoxy-functionalized dispersant to the oil-in-water emulsion before polymerization is complete comprises adding the ethoxy-functionalized dispersant when the pH of the oil-in-water emulsion is between about 2.60 and about 2.75.

26. The method of claim 21, wherein adding the ethoxy-functionalized dispersant to the oil-in-water emulsion comprises adding the ethoxy-functionalized dispersant approximately 40 to 50 minutes after adding formaldehyde to the oil-in-water emulsion.

27. The method of claim 21, wherein the ethoxy-functionalized dispersant comprises at least one of the group consisting of an ethoxylated polyethylene, an ethoxylated amine, an ethoxylated hydroxyl, an ethoxylated phosphate, an ethoxylated phenol, and a functionalized ester of a phosphoric acid derivative.

28. The method of claim 21, wherein the ethoxy-functionalized dispersant comprises at least one of the group consisting of an ethoxy-functionalized silica, an ethoxy-functionalized clay, and an ethoxy-functionalized oxide; and wherein upon shearing, the ethoxy-functionalized silica, ethoxy-functionalized clay, or ethoxy-functionalized oxide breaks down to form a nano-scale material.

29. The method of claim 21, wherein the ethoxy-functionalized dispersant comprises a liquid non-ionic polyethylene oxide-based dispersant.

\* \* \* \* \*